(12) United States Patent
Jiang et al.

(10) Patent No.: US 7,424,714 B2
(45) Date of Patent: Sep. 9, 2008

(54) MISSION COLLABORATION SYSTEM

(75) Inventors: Hubin Jiang, 10359 Carol St., Great Falls, VA (US) 22066; Baiyun Gao, Vienna, VA (US)

(73) Assignee: Hubin Jiang, Great Falls, VA (US)

( * ) Notice: Subject to any disclaimer, the term of this patent is extended or adjusted under 35 U.S.C. 154(b) by 1002 days.

(21) Appl. No.: 10/688,633

(22) Filed: Oct. 17, 2003

(65) Prior Publication Data

US 2005/0086281 A1    Apr. 21, 2005

(51) Int. Cl.
*G06F 9/46* (2006.01)
*G06F 15/16* (2006.01)
*G06Q 10/00* (2006.01)
*G06Q 40/00* (2006.01)

(52) U.S. Cl. .......................... 718/106; 709/201; 705/1; 705/35; 705/37

(58) Field of Classification Search ......... 718/100–108; 709/201–203; 705/1, 5–8, 35–37
See application file for complete search history.

(56) References Cited

U.S. PATENT DOCUMENTS

| | | | |
|---|---|---|---|
| 5,826,252 A * | 10/1998 | Wolters et al. .................. 707/1 |
| 6,385,594 B1 * | 5/2002 | Lebda et al. .................. 705/38 |
| 6,571,246 B1 | 5/2003 | Anderson et al. | |
| 6,611,816 B2 * | 8/2003 | Lebda et al. .................. 705/38 |
| 6,622,131 B1 * | 9/2003 | Brown et al. .................. 705/38 |
| 6,823,319 B1 * | 11/2004 | Lynch et al. .................. 705/38 |
| 6,957,192 B1 * | 10/2005 | Peth ............................ 705/38 |
| 7,051,071 B2 * | 5/2006 | Stewart et al. ............... 709/204 |
| 7,143,186 B2 * | 11/2006 | Stewart et al. ............... 709/245 |
| 7,146,337 B1 * | 12/2006 | Ward et al. .................... 705/38 |
| 7,249,157 B2 * | 7/2007 | Stewart et al. ............... 709/204 |
| 2001/0039570 A1 * | 11/2001 | Stewart et al. ............... 709/205 |
| 2002/0010741 A1 * | 1/2002 | Stewart et al. ............... 709/204 |
| 2002/0013759 A1 * | 1/2002 | Stewart et al. ................ 705/37 |
| 2002/0019797 A1 * | 2/2002 | Stewart et al. ................ 705/37 |
| 2002/0156693 A1 * | 10/2002 | Stewart et al. ................ 705/26 |
| 2002/0161688 A1 * | 10/2002 | Stewart et al. ................ 705/37 |

(Continued)

OTHER PUBLICATIONS

Dong et al., "A Framework for Optimizing Distributed Workflow Executions", Springer-Verlag Berlin, 2000, pp. 152-167.*

(Continued)

*Primary Examiner*—Meng-Ai An
*Assistant Examiner*—Jennifer N To
(74) *Attorney, Agent, or Firm*—Roberts Mlotkowski Safran & Cole, P.C.

(57) ABSTRACT

A system and methodology for performing tasks in a networked computing environment. The invention disclosed herein broadly applies to a universe of tasks which are currently or might be in the future accomplished through the use of one or more computing devices in communication with one another. According to a preferred embodiment, missions are accomplished using a networked computing environment according to a novel process. First a Mission Instance is created which defines the tasks associated with the Mission as specifically applied to the particular time that the mission is to be completed. Once the Mission Instance has been created, it is executed according to the particular Task Instances that are defined therein. Tasks may be accomplished locally or they may be accomplished remotely via communication of a task instance to a remote server.

13 Claims, 8 Drawing Sheets

U.S. PATENT DOCUMENTS

2004/0049450 A1* 3/2004 Lussler ............... 705/38
2004/0111302 A1* 6/2004 Falk et al. ............ 705/4
2004/0162741 A1* 8/2004 Flaxer et al. ......... 705/7
2005/0010507 A1* 1/2005 Straub ................ 705/35

OTHER PUBLICATIONS

Bussler et al., "Enterprise-Wide Workflow Management", IEEE, 1999, pp. 32-43.*

* cited by examiner

MISSION COLLABORATION SYSTEM

BACKGROUND

1. Field of the Invention

The present invention relates generally to systems and processes for accomplishing tasks in a computing environment and more particularly to systems and methods for collaborating tasks in a networked environment.

2. Background of the Invention

In the early twenty first century, it is now hard to imagine life without computers. Computers are involved in an extraordinarily broad array of matters involving personal lives and business and professional activities. As a general matter, it can be said that computers are used to accomplish tasks via applications which are designed for the particular purpose. This is true whether a business process such as mortgage underwriting is being undertaken or in connection with a personal task such as balancing a checking account.

Many, although not all, computer based tasks rely on a networked environment wherein the universe of data and/or application programming necessary to accomplish the overall task is distributed among more than one computing device. In these cases, the computing devices communicate with one another such that data, application programming and external inputs can be shared among all or some of the computing devices towards the goal of achieving the overall task. The "network" may be any one of known interconnection methodologies that allows for communication. For example, various networks such as the Internet, wide area networks, local area networks, wireless connectivity and business based intranets may be used.

Unfortunately, various drawbacks associated with task processing in a distributed environment exist. These drawbacks manifest themselves in many ways such as causing delays in task accomplishment or particular steps associated therewith. Additionally, most current network based applications require significant expenditures of labor and money in order to get them set up working properly and maintained. Furthermore, in these distributed environments, the weakest link in the chain can cause the whole process to be delayed or, worse, could prevent the overall task from being completed. In practice this means that if one of the computers which has responsibility for performing a necessary step in the overall task is unavailable or is not functioning properly, the execution of the overall task could be at risk.

By way of example, in the case of an internet based storefront, as the same is currently implemented, various business entities, various computing platforms and various software applications distributed in various places may be involved. The front end interface may reside on one computer server, the database of available products and the related database application may reside on another server, the credit card processing application may reside on yet another server and the fulfillment processing application may be located on still another server. If any one of these servers and/or applications malfunctions or becomes unavailable, customer orders may be substantially delayed or remain unfulfilled.

Furthermore, computer based tasks and, in particular, network based tasks are usually designed such that a centralized database and centralized processor are used to control the overall task at a high level while some or all sub-tasks may be implemented on remote processors with or without access to separate remote databases. This implementation suffers from various drawbacks. For one, if the centralized processor or database is unavailable or malfunctioning, the overall task will be at risk and/or delayed. Further, each task that is assigned to a remote node is implemented with separate software which must be separately purchased, installed, maintained and configured. This can be time consuming not to mention that it can lead to errors, interface incompatibilities, version incompatibilities, communication link failures and other problems. When more than one business entity is involved in an overall process, these entities must be highly diligent in communicating with one another in order to ensure that handoffs, data-sharing, versioning, and communication issues are all properly addressed.

SUMMARY OF THE INVENTION

It is therefore a primary object of the present invention to provide a system and methodology which improves upon prior art systems and methodologies and addresses their related drawbacks as described above.

It is an object of the present invention to provide a system and methodology for accomplishing tasks in a networked computing environment.

It is another object of the present invention to provide a system and methodology for accomplishing tasks in a computing environment without the need for a centralized database.

It is yet another object of the present invention to provide such a system and methodology in which steps within a task may be distributed among multiple service nodes.

It is a still further object of the present invention to provide a system and methodology having redundancy with respect to platforms for accomplishing task steps.

It is a yet further object of the present invention to provide a system and methodology for accomplishing tasks wherein task steps may be carried out in parallel.

It is an even further object of the present invention to provide a system and methodology for accomplishing tasks without the need to store software code associated with particular task steps at multiple remote nodes.

These and other objects of the present invention are obtained through the use of a novel system and methodology for performing tasks in a networked computing environment. The invention disclosed herein broadly applies to a universe of tasks which are currently or might be in the future accomplished through the use of one or more computing devices in communication with one another. According to the teachings of the present invention, "missions" comprise an ultimate goal to be achieved. For example, an exemplary mission may correlate with the goal of an individual home buyer applying for, obtaining and closing on a loan in connection with the purchase of a new home. For the purposes of this disclosure, each of the process steps which are either mandatory or optional in connection with the overall mission are referred to herein as "tasks" and each of steps associated with each of the tasks are referred to as "task steps". Tasks may be accomplished locally or they may be accomplished remotely via communication of a task instance to a remote server.

According to a preferred embodiment, missions are accomplished using a networked computing environment according to a novel process. First, a Mission Instance is created which defines the tasks associated with the Mission as specifically applied to the particular time that the mission is to be completed. Once the Mission Instance has been created, it is executed according to the particular Task Instances that are defined therein.

These and other advantages and features of the present invention are described herein with specificity so as to make the present invention understandable to one of ordinary skill in the art.

DETAILED DESCRIPTION OF THE INVENTION

The present invention for completing missions in a networked computing environment is now described. The present invention comprises a system for completing said missions as well as processes therefor. In the description that follows, numerous specific details are set forth for the purposes of explanation. It will, however, be understood by one of skill in the art that the invention is not limited thereto and that the invention can be practiced without such specific details and/or substitutes therefor. The present invention is limited only by the appended claims and may include various other embodiments which are not particularly described herein but which remain within the scope and spirit of the present invention.

As an aid to the reader in understanding the present disclosure, the following summary of key terms used in this document is now provided. It will be understood by one of skill in the art that these definitions are provided solely as an aid in understanding and such terms may have different meanings and/or interpretations in different contexts and according to the particular usage thereof.

Figure 4:
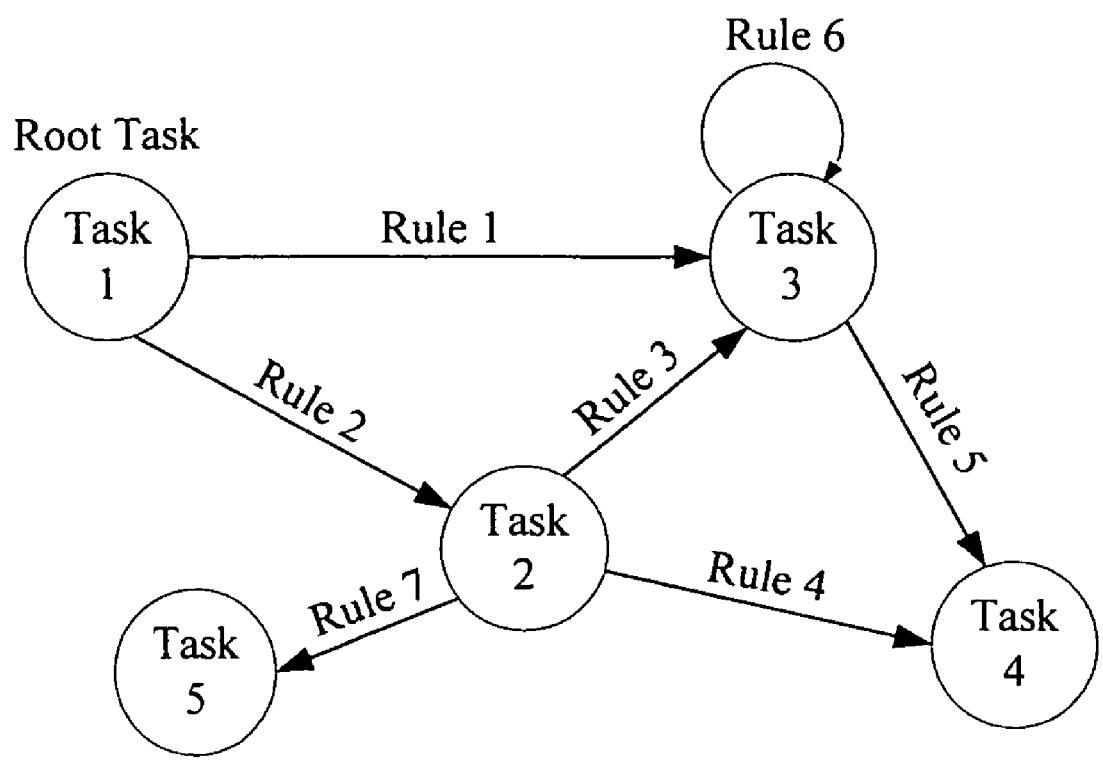
FIG. 4 illustrates an exemplary mission definition in accordance with the operation of the present invention in a preferred embodiment thereof.

Mission: A Mission defines a set of Tasks and Trigger Rules logically related, such as shown in FIG. 4. A Mission begins with a Root Task. A Mission may or may not have an ending Task. This is because Missions may not be always designed to realize an ending task. Instead, Missions may be designed to realize several goals possibly repeatedly.

Mission Coordinator (MC): A Mission Coordinator is the core functional module providing the core function of collaboration.

Mission Instance (MI): A Mission Instance is an instance created according to its corresponding Mission. While a Mission is a definition which remains with its Mission Coordinator, the Mission Instance of a Mission is an active director for a specific Mission Instance governing how a Mission is executed.

Mission Administrator (MA): A Mission Administrator provides functionality for a user to monitor, administrate, and configure a Mission and the execution thereof.

Collaboration Enabler (CE): A Collaboration Enabler is an interface that interacts with a user application and therefore enables the application to work in a collaborative environment.

Mission Collaboration Foundation (MCF): A Mission Collaboration Foundation comprises a Mission Coordinator, Mission Administrator, and Collaboration Enabler.

Mission Collaboration System (MCS): A Mission Collaboration System consists of a Mission Coordinator, Mission Administrator, and all service resources enabled by the Collaboration Enabler and connected directly to the Mission Coordinator.

Service Node (SN): A Service Node is a processing device such as a server computer enabled to provide results, information, services, actions, or to otherwise execute requests. A Service Node may be a computer workstation or a device enabled by a Collaboration Enabler and connected locally to its Mission Coordinator (called a Local Service Node), or a remote system enabled by Collaboration Enabler or a remote Mission Collaboration System connected directly to the Mission Coordinator (called a Remote Service Node), or a system enabled by Collaboration Enabler or a Mission Collaboration System connected indirectly the Mission Coordinator via another Mission Collaboration System (called a Foreign Service Node).

Task: A Task defines an elementary service request. In other words, a Task is a definition of a request to be fulfilled which may comprise a series of Steps.

Task Instance (TI): A Task Instance is an instance created based upon its corresponding Task. While a Task is a definition and remains with its Mission Coordinator, the Task Instance of a Task moves throughout the collaboration network, being executed by specified Service Node(s), and conveying input and results between Mission Coordinator and Services Nodes. A Task Instance, if executed, returns results to its initiating Mission Coordinator. The result(s) however, may not be the result(s) that meet the requirements of the corresponding Task. Result(s) may be selected and analyzed after results from several Task Instances of the Task are received. As such, in some cases, several Task Instances of a Task may be created by its Mission Coordinator (or a Task Instance is broadcast to more than one Service Nodes) and executed by one or more Service Node(s).

Figure 3:
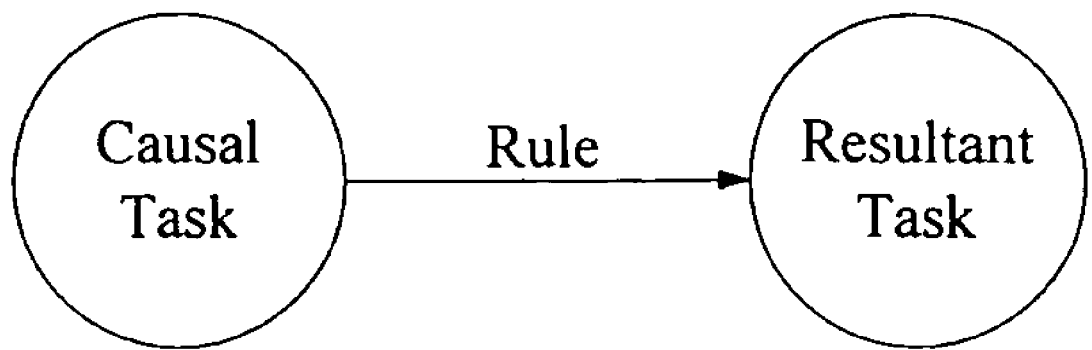
FIG. 3 illustrates a causal task, a resultant task, a rule and the relationship therebetween in accordance with the operation of the present invention in a preferred embodiment thereof.

Trigger Rule (TR): A Trigger rule is defined as a Causal Task Rule (which is a set of conditions), and a Resultant Task as illustrated in FIG. 3.

Root Task (RT): A Root Task is the first Task in a Mission.

Figure 1:
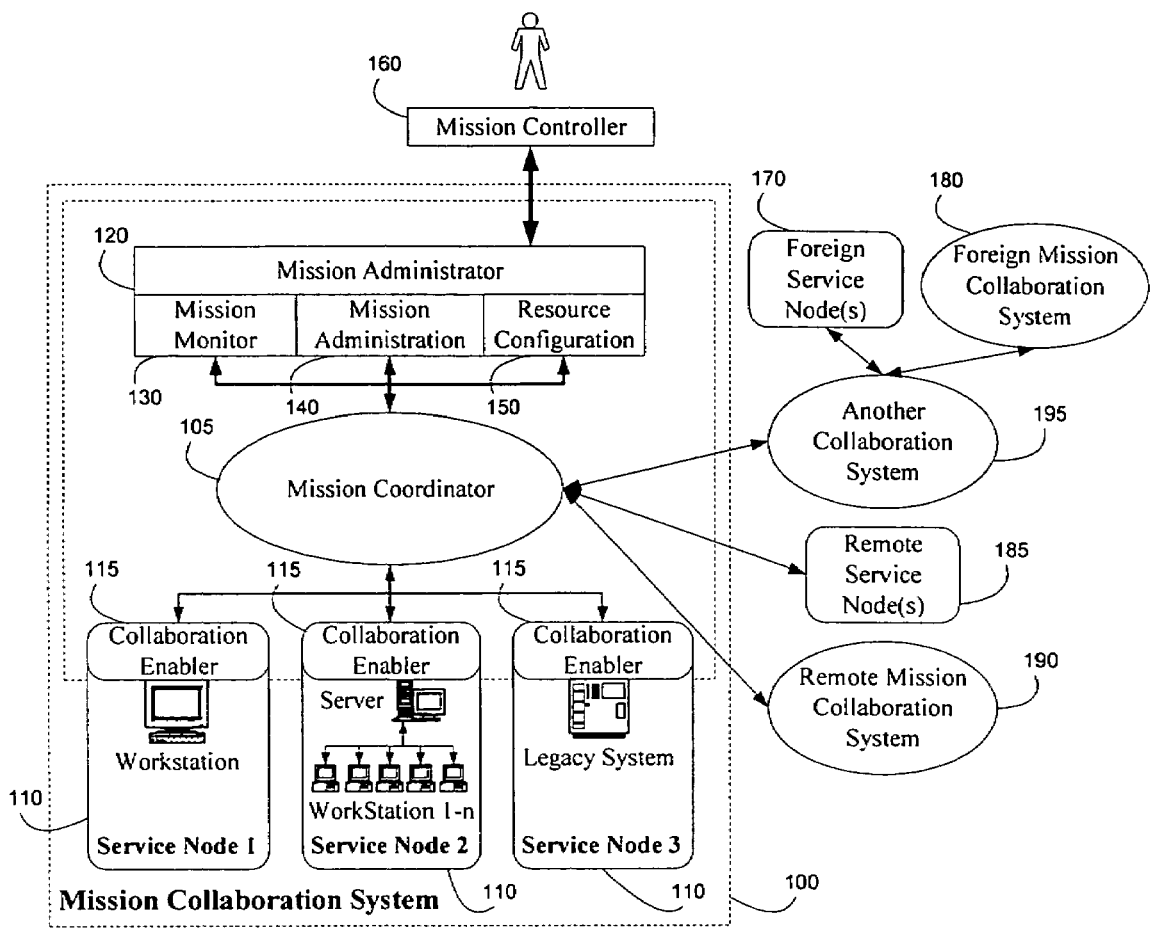
FIG. 1 is a diagram illustrating the key components of the mission collaboration system of the present invention in a preferred embodiment thereof.

Now that some key definitions have been set forth, an overview of the system of the present invention according to a preferred embodiment thereof is provided with reference to FIG. 1. Mission Collaboration System (MCS) 100 which consists of a Mission Coordinator (MC) 105, a Mission Administrator (MA) 120, and one or more Service Nodes (SN) 110. Each SN 110 is enabled by an associated Collaboration Enabler (CE) 115. Service Nodes may comprise a Local Service Node 110, a Remote Service Node 185, or a Foreign Service Node 170. Mission Collaboration System 100 can be monitored, set up, and administrated by a Human Operator via terminal called Mission Controller 160. In the case of a Remote Service Node 185, communication with Mission Coordinator 105 is via an electronic link such as a network link which may be wire based or wireless. However, in the case of a Foreign Service Node 170, communication with Mission Coordinator 105 is via an electronic link such as a network link which may be wire based or wireless indirectly through another Collaboration System 195. A MCS 100 can work with another MCS, called Remote MCS 190. at a remote geographic location, and/or work with a MCS, called Foreign MCS 180, through different Collaboration System 195. Mission Coordinator 105, Mission Administrator 120, and all Collaboration Enablers collectively comprise the Mission Collaboration Foundation.

Mission Coordinator 105 is the core of Mission Collaboration System 100, and is responsible for the creation, removal, deletion, and management of Task Instances and Mission Instances. Mission Coordinator ensures execution of all Mission Instances by causing the execution of all Task Instances associated with each Mission Instance.

Mission Administrator 120 is a system tool providing Mission Coordinator 105 with the functional capability to administrate and control the operation of a Mission Instance. Mission Administrator 120 consists of Mission Monitor component 130, Mission Administration component 140, and Resource Configuration component 150. Mission Administrator preferably communicates with a database (not shown). This database stores mission control information as discussed below. In a preferred embodiment, a separate Mission Administrator 120 is provided for the administration of each available Mission.

Mission Monitor 130 provides a tool for Mission Coordinator 105 to monitor the operation of each mission including all information and status concerning the operation of each Mission and Mission Instance. Mission Administration 140 provides a tool permitting Mission Controller 105 to administrate the users and Service Nodes which are authorized to communicate with Mission Collaboration System 100. The users include groups who use the system to fulfill the missions, and operators who perform specific operations in connection with the function and maintenance of MCS 100 via one or more workstations connected to Service Nodes 110, 170 and/or 185.

Administrative functions may include the addition, removal, and modification of group and operator user accounts, authentication verification, password management, service node inventory and participation management as well as other related operations. Mission Administrator 120 also provides tools assisting Mission Coordinator 105 with the design of missions. Mission Administrator submits missions to Mission Coordinator 105 and serves initiate commands directed to ending, aborting, pausing, removing, and modifying missions.

Resource Configuration component 150 provides assistance to Mission Coordinator 105 in connection with the registration and management of resources used by Service Nodes 110, 170 and 185. It also provides status information including availability information concerning these resources. Mission Administrator 120 includes a set of interfaces which permit user-defined program applications to work with Mission Administration 140 and its associated database.

Figure 2:
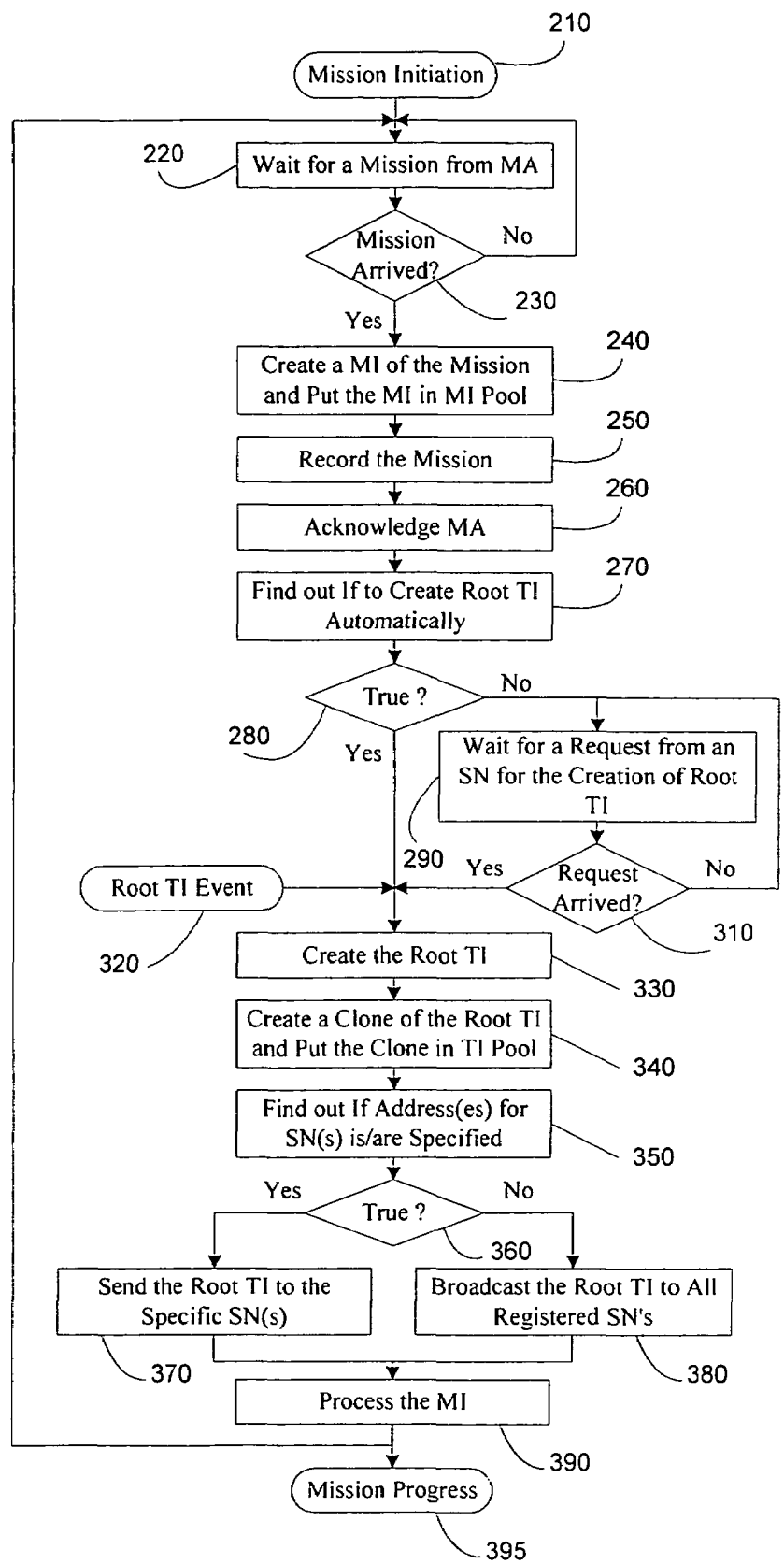
FIG. 2 is a flow diagram illustrating the mission initiation procedure according to the methodology of the present invention in a preferred embodiment thereof.

Turning now to the flowchart of FIG. 2, an overview of the mission initiation process of the present invention is provided. This process is controlled by Mission Coordinator 105 as follows. Mission Coordinator 105 defines a mission based on the requirements of the mission and the capabilities of Mission Collaboration System 100 including the resources available to Mission Collaboration System 100. Mission Initiation starts at step 210 and Mission Coordinator 105 waits for a mission to be presented by MA 140 at steps 220 and 230. Once the mission is defined and arrives at MC 105. Mission Coordinator 105 creates a Mission Instance of the mission specific to the specific request at step 240. This Ml is stored in an Ml pool. At this point, the mission presented by MA 120 is recorded at step 250 and MA 120 receives an acknowledgement from MC 105 that an Ml has been created (step 260). If the mission is such that the root Task Instance can be created locally and automatically without SN intervention, which is determined in steps 270 and 280, control passes to step 330. Otherwise, the process waits for a request from the applicable SN for the creation of the Root TI at steps 290 and 310. As described below, the request received from the SN may include particular directions with respect to the Root TI. Once the Root TI is created at step 330, a clone of the Root TI is placed in the TI pool at step 340. If one or more addresses for service nodes to perform the Root TI are specified, which such condition is determined in steps 350 and 360, and then the Root TI is sent to the applicable service nodes (step 370). Otherwise, the Root TI is broadcasted to all registered service nodes (step 380) so that any such service nodes capable of handling the Root TI can do so. Processing of the Mission Instance then continues at step 390 and the mission progress steps are initiated at step 395. A mission can also be one which creates a Ml every time an event triggers. Such event is called Root TI Event 320, which may be, but is not necessarily limited to, a timer.

Further discussion with respect to tasks and trigger rules is now provided with reference to FIG. 3. The reasoning engine component (discussed in further detail below) of Mission Coordinator 105, functions to reason the relationships between causal tasks and resultant tasks based on a particular trigger rule associated with a mission. In other words, a causal task is initially specified by a mission. Based upon execution of Task Instances, the casual task generates results which are returned and are treated as inputs to the specified rule. Task Instances of the causal task generate results, which become inputs to the applicable Rule. In order to generate all results for a causal task, multiple Task Instances of the causal task may be created. Results returned by the Task Instances may not arrive at Mission Coordinator 105 at the same time. Therefore, when a Result from a Task Instance arrives, conditions are evaluated along with other previously returned results of the causal task. Once the universe of returned results serve to satisfy the rule conditions, a new Task Instance with a resultant task is triggered.

A Task may be a resultant task in one Trigger Rule, but a causal task in another. The reasoning engine is responsible for the execution of Trigger Rules. Reasoning engine in Mission Coordinator 105 determines the creation of a resultant task based on the result values and rule of corresponding causal task. The causal-resultant relationship is governed by the corresponding Trigger Rule. After a resultant task instance is created, Mission Coordinator 105 transmits it to a specific Service Node or broadcasts it to a group of Services Nodes. As shown in FIG. 1, a Service Node can be a different Mission Collaboration System 180 or 190.

In order to make the Trigger Rule and Task aspects of the present invention clearer, an example is now discussed in connection with FIG. 4. According to this Figure, Task 1 represents the Root Task or the first task performed in connection with the overall mission illustrated by the example in FIG. 4. In this case, Task 1 is the causal task and Tasks 2 and 3 are possible resultant tasks. Depending upon the particular trigger rule, once Task 1 has been completed and results returned, processing may continue at either or both of Task 2 and Task 3 depending upon the application of the results of Task 1 to Rules 2 and 1 respectively. As discussed above, multiple instances of Task 1 may be executed in parallel or over different time periods and either locally or at remote service nodes. As results from the completion of Task 1 are returned over time and the Rules are applied to these results, new tasks are launched. The diagram in FIG. 4 may represent the definition of an exemplary mission which is not considered complete until all Tasks required to be completed (based on results returned and rules) have been completed.

Figure 5:
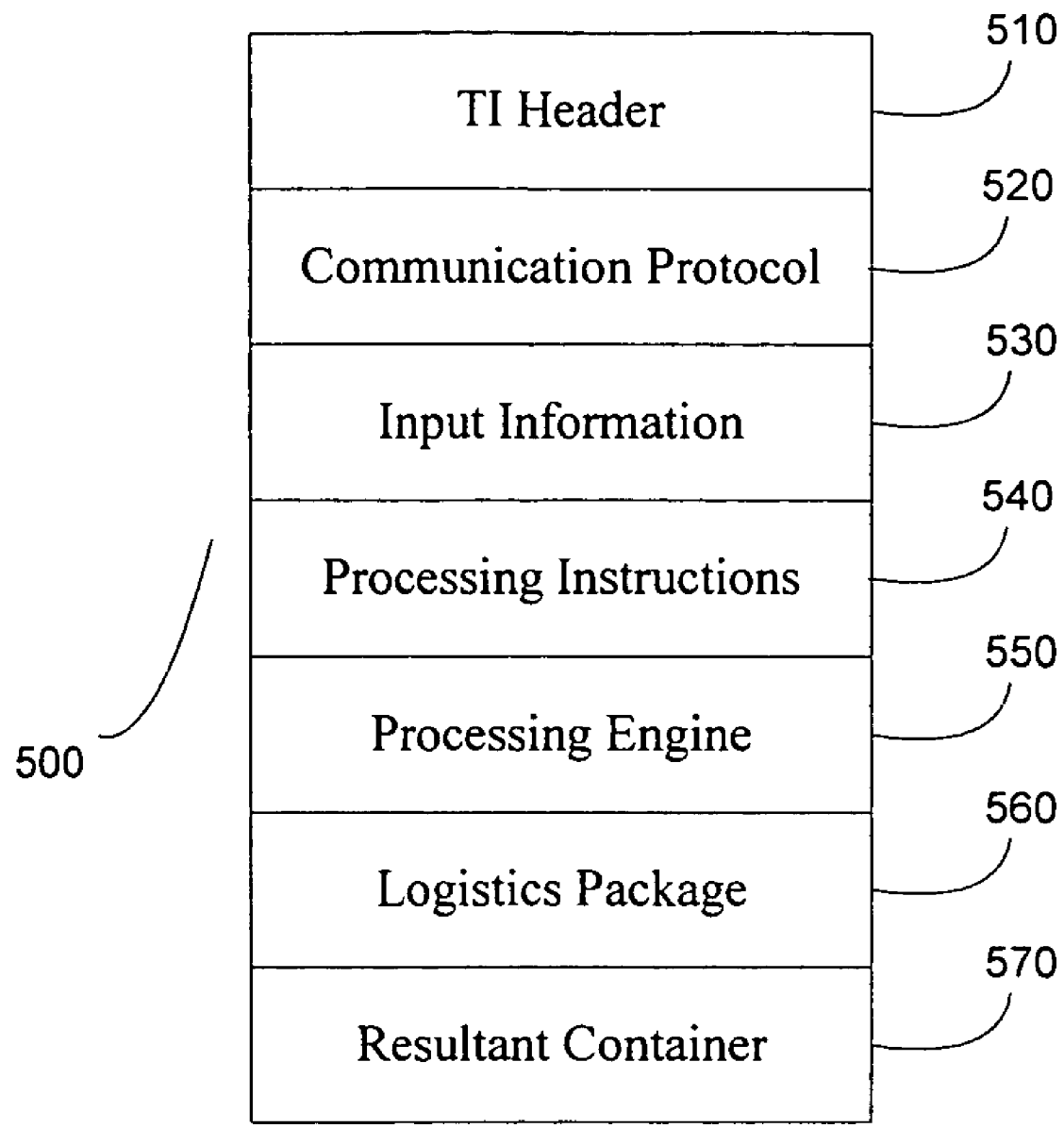
FIG. 5 illustrates the various components of an exemplary task instance as used in the present invention according to a preferred embodiment thereof.

Turning now to FIG. 5, the innovative task instance (TI) structure 500 of the present invention is next described. The task instance structure is a very important aspect of the present invention in that it allows the system to be robust and flexible. The TI structure 500 consists of a number of components. Collectively, these components make up the TI and the TI is packaged and transmitted to remote service nodes for completion of the task represented by the TI. Alternatively or in addition, the TI may form the basis for task completion locally at the host node.

In one embodiment, the TI may include some or all of the following components as shown in FIG. 5: header information 510, communication protocol 520, input information 530, processing instructions 540, processing engine 550, logistics package 560, and resultant container 570. When an TI reaches a targeted service node, the TI is queued for task execution according to the information carried by the TI. Since the TI may carry processing engine component 550 for a specific task, the service node may not be required to store or otherwise provide application software on its own. Instead, some or all necessary software code is carried within the TI.

In a preferred embodiment, TI Header 510 contains basic information identifying the TI, and may also contain additional information such as time stamps, service node address/identification, return address, and other related information. Communication Protocol 520 specifies the rules and protocols for communication between the sender of TI 500 (the host node) and the receiver of the TI (the service node). Communication Protocol 510 can be changed from time to time without the requirement for new or modified programming. Input Information 530 is used to store information regarding the location of input data necessary for the task to be completed. Such information may include, for example, keyboard input from a user or stored data such as images, data and other information. Processing Instructions 540 provides the service node with instructions necessary to complete the task. This may be in the form of software code or other information in another format which assists processing engine 550 in the completion of the task. The Processing Engine 550 is a preferably a software based executable which may be implemented by the service node or the service node's application program container, which is actually an application to generate the results.

For example, Processing Engine 550 may be a data entry application requiring an operator to do data entry processing. Such data entry application can be different from TI to TI depending upon the particular requirements. Logistics Package 560 provides information concerning any administrative sub-tasks or repositories information which is necessary or helpful in completing the task. Resultant Container 570 is the area where any results which may be generated from completion of the task are stored so that they can be accessed and used by the host node and/or other service nodes.

In a preferred embodiment of the present invention, the following information is included within various components of TI 500 prior to transmission of the same to one or more service nodes:

1) Mission ID: defines the identifier of a Mission Instance;
2) Priority: defines the priority of this Task;
3) Target Service Nodes: defines service nodes that may perform this task;
4) Effect Time: defines the duration of the Task;
5) Root Task: defines the status of root task of the Task;
6) Manage Mode: defines processing instruction;
7) Sub Tasks: defines the procedures or requirements to be performed;
8) Inputs Template: defines the input conditions of the task;
9) Result Template: defines the format of results from the performance of the task.

Figure 6:
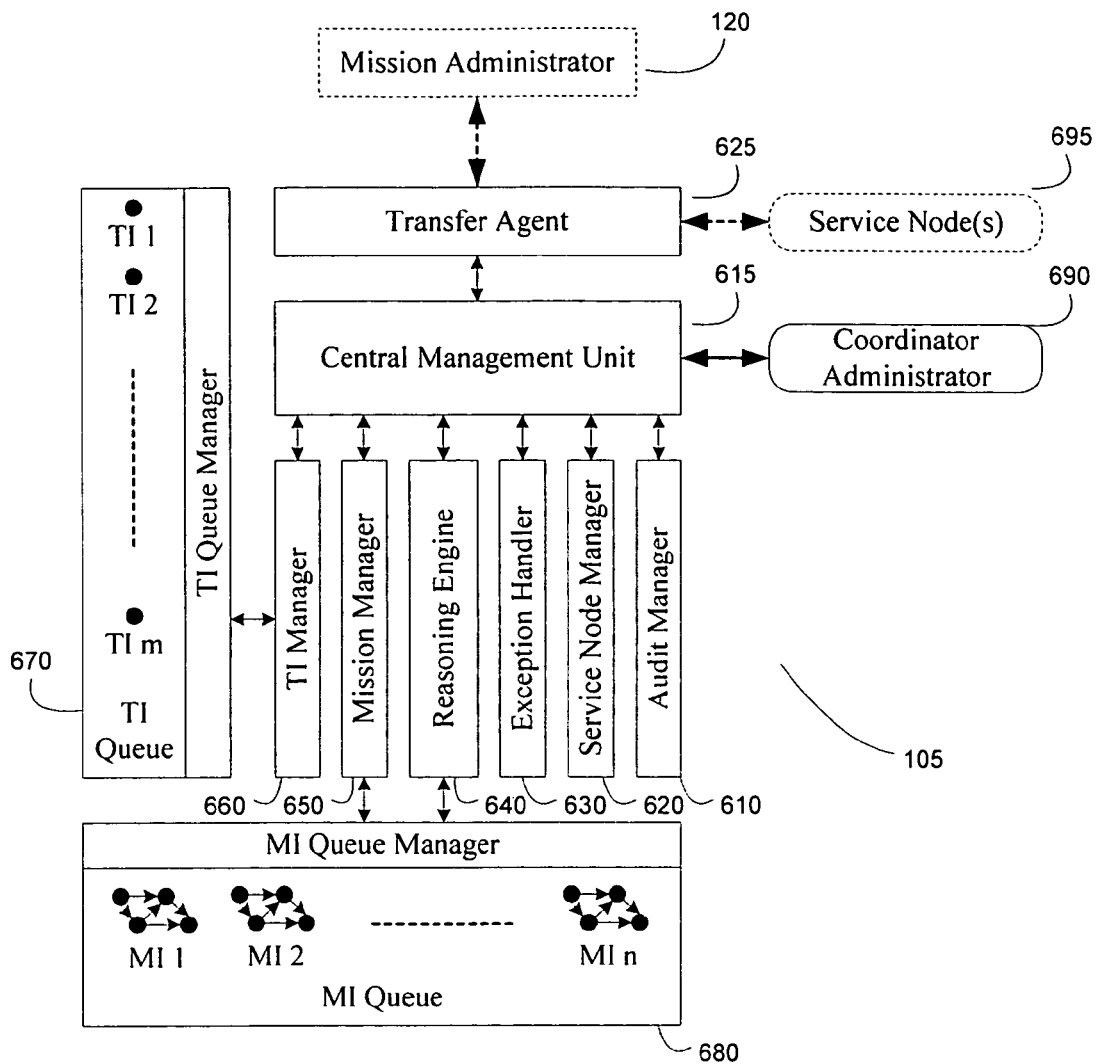
FIG. 6 is a block diagram illustrating the components of the Mission Coordinator of the present invention according to a preferred embodiment thereof.
Figure 7:
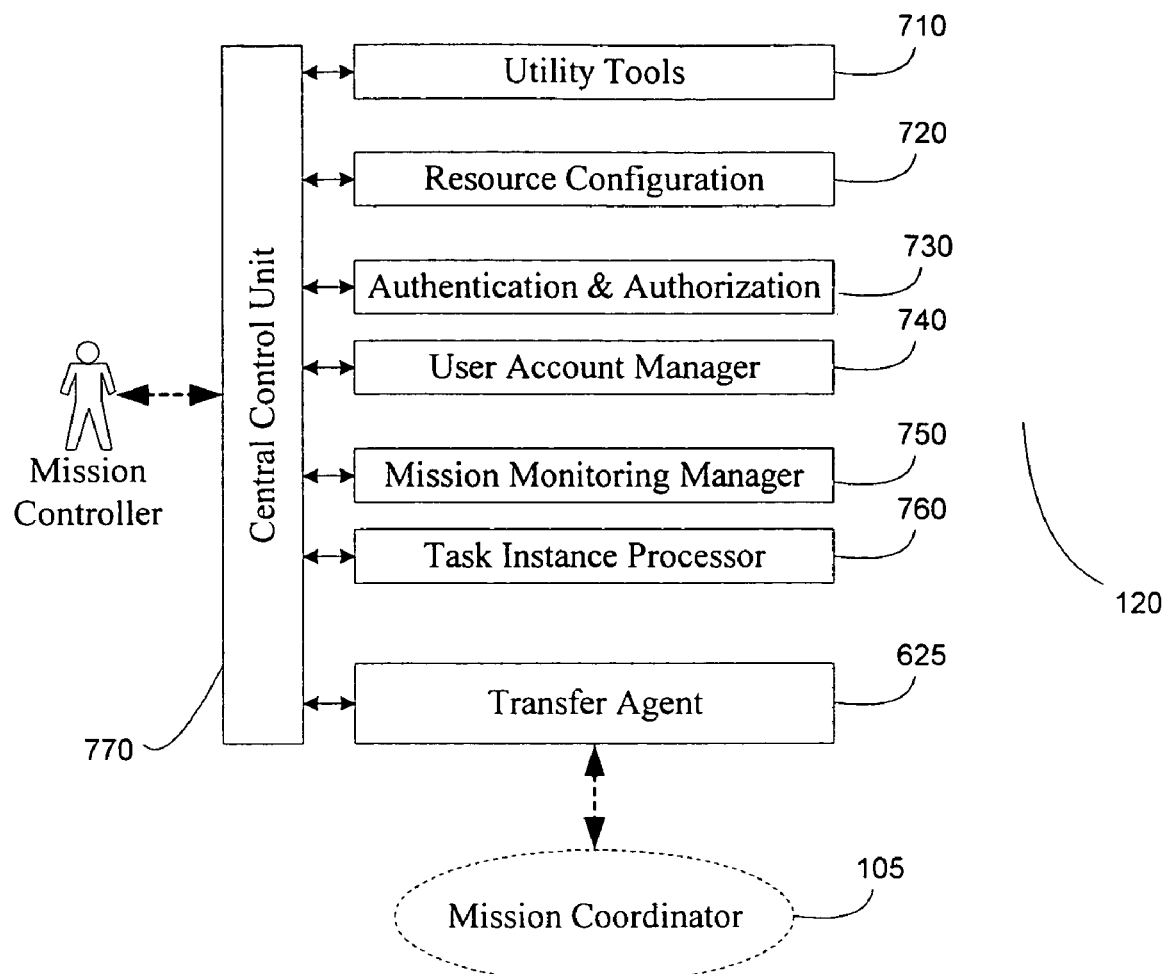
FIG. 7 is a block diagram illustrating the architecture of the Mission Administrator of the present invention according to a preferred embodiment thereof.

Now that the overall methodology and system components of the present invention have been described, the following discussion, in connection with FIGS. 6 and 7, provides additional details regarding the novel system architecture of the present invention. Referring first to FIG. 6, a description of the Mission Coordinator 105, its various components and their interaction is now provided:

Central Management Unit (CMU) 615

The Central Management Unit 615 manages and controls the operation of Mission Coordinator 105. All operations and logical control are managed by the CMU 615.

Coordinator Administrator (CA) 690

The Coordinator Administrator 690 is a program application which administrates and monitors the operations of Central Management Unit 615. The operations include abortion, deletion, and pausing of Mission Instances. CA 690 also monitors auditing information, service node information, and exception history.

Mission Instance Queue (MIQ) 680

The Mission Instance Queue 680 is the place where individual Mission Instances are managed and queued. MIQ 680 consists of an actual queue and an MI Queue Manager. The MI Queue Manager manages Mission Instance initiation in accordance with the defined queue policy for the system.

Task Instance Queue (TIQ) 670

The Task Instance Queue 670 is the place where Task Instances are managed and queued. TIQ 670 consists of the actual queue plus a TI Queue Manager. The TI Queue Manager manages Task Instance initiation in accordance with the defined queue policy for the system.

Transfer Agent 625

The Transfer Agent 625 provides communication between Mission Coordinator 105 and Mission Administrator 120 and Service Nodes 695. Transfer Agent 625 receives messages, converts them into internal objects, and then passes these objects to Central Management Unit 615 for processing. Transfer Agent 625 is also responsible for retrieving an object from the Central Management Unit 615, converting the object into a message, and sending the message out.

Reasoning Engine (RE) 640

The Reasoning Engine 640 reasons the relationships between causal tasks and resultant tasks based on a trigger rule of a Mission. Reasoning Engine 640 accepts a Task Instance from the Central Management Unit 615, and performs the reasoning. Reasoning Engine may be called upon to perform complex reasoning in executing a Mission since, among other things, the fulfillment of a Task may need require multiple Task Instances to be executed.

Mission Manager 650

The Mission Manager 650 manages operations related to Missions and to Mission Instances, such as the creation of MIs, deletion of MIs, abortion of MIs, pausing of MIs, etc.

TI Manager 660

The TI Manager 660 creates Task Instances and clones Task Instances as necessary. It is also responsible for commanding TI Queue 670 to perform TI related operations such as TI removal, TI insert, TI delete, etc.

Audit Manager 610

The Audit Manager 610 stores and manages information concerning queries made regarding the capabilities of the Coordinator 105, and all other Coordinator access information such as information concerning who, where, when, what, etc.

Service Node Manager 620

The Service Node Manager 620 maintains information concerning local service nodes 110 including storing and managing information such as a Service Node Identification List, etc.

Exception Handler 630

The Exception Handler 630 deals with abnormal situations during mission coordination including hardware problems, network problems, service node connectivity problems etc.

Now that the major components of Mission Coordinator 105 and their functions have been described, a discussion regarding the actual operation of the Mission Coordinator 105 in a preferred embodiment is next provided. In one case, when Transfer Agent 625 receives a new Mission from Mission Administrator 120, Transfer Agent 625 converts the message into an internal object, and passes it to Central Management Unit 615. Central Management Unit 615 recognizes that the object is a Mission. Based upon the parameters defined in the object, Central Management Unit 615 commands Mission Manager 650 to create a Mission Instance of the Mission, and in turn Mission Manager 650 passes the MI to MI Queue 680.

In another case, when Transfer Agent 625 receives a completed Task Instance from a local or remote service node, Transfer Agent 625 converts the message into an internal object, and passes it to Central Management Unit 615. Central Management Unit 615 recognizes that the object is a completed Task Instance. Next, it commands Reasoning Engine 640 to perform the reasoning on the TI. Reasoning Engine 640 will either ask Central Management Unit 615 for another TI in order to fulfill the reasoning of a trigger rule, or ask Central Management Unit 615 for the creation of a resultant Task Instance. In the case of the former, the Mission Coordinator 105 simply wait, if it is the latter, Central Management Unit 615 will command the TI Manager 670 to create a new TI and its clone. The TI Manager 670 will place the clone in TI Queue 670, and then pass the new TI to Central Management Unit 615. Central Management Unit 615 will then send the new TI to Transfer Agent 625. Transfer Agent 625 converts the new TI object into message, and sends the message out.

Mission Administrator 120 and its components in a preferred embodiment of the present invention is illustrated in FIG. 7. Mission Administrator 120 provides tools for Mission Controller 105 to administrate and monitor the operations of a Mission. As detailed in FIG. 7, Mission Administrator 120 includes Task Instance Processor 760 and Mission Monitoring Manager 750. Also included is a component 740 for handling User Account Manager and Authentication & Authorization 730 and Resource Configuration 720. Additional components include various utility tools 710 useful in connection with Controller's administration operation. The Mission Administrator 120 also includes a Central Control Unit 770 that controls and manages each and every module, and a Transfer Agent 625 that passes messages between Mission Administrator 120 and Mission Coordinator 105.

The major responsibility of Mission Monitoring Manager 750 and Task Instance Processor 760 is to collectively process Task Instances, extract all the information about the Task Instances, and deposit the information in database. The Mission Monitoring Manager 750 provides ways for the Mission Controller to submit a Mission and to monitor the operation of the Mission Instances.

Mission Administration provides group account management and user account management, including login, logout, password setup and change, etc. Plus, it provides security functions like authentication and operation authorization. Resource Configuration 720 manages the inventory of service nodes, assigns the utilization of those service nodes, and stores the information and status concerning those service nodes. Utility Tools 710 provide many tools including a graphics mission design tool, a service API for third party applications, report tools, etc.

Figure 8:
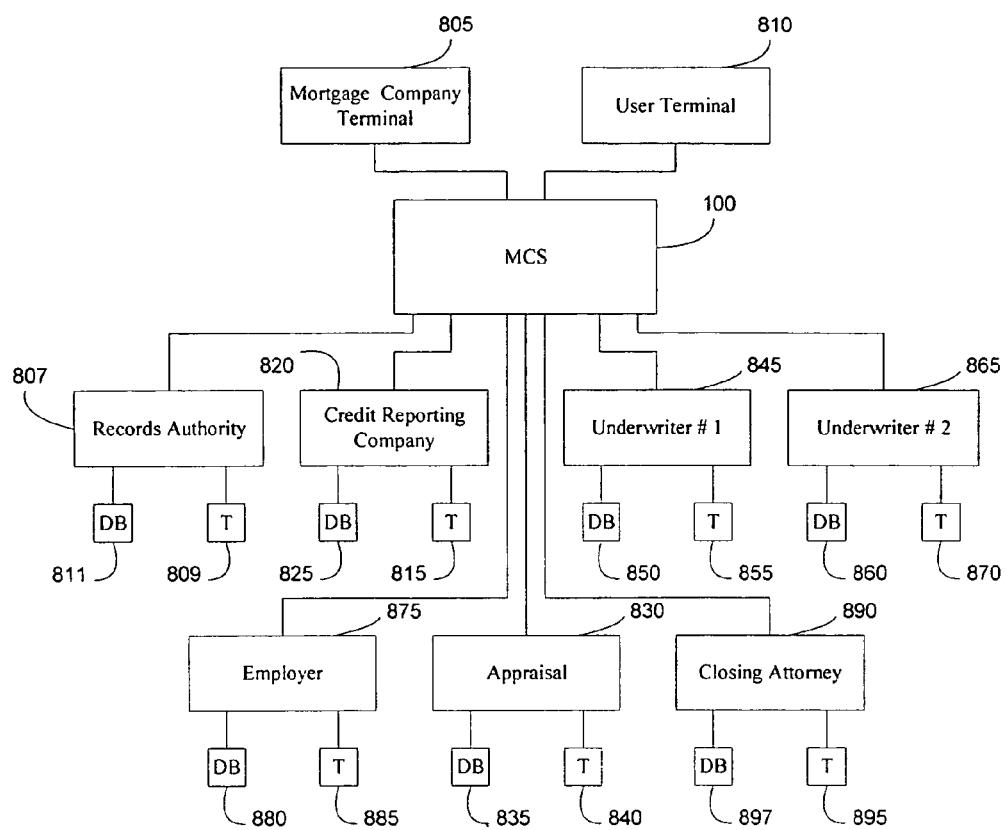
FIG. 8 is a block diagram illustrating an exemplary application of the system and methodology of the present invention in the context of the processing of a mortgage loan on behalf of a user.

Referring now to FIG. 8, the operation of the system of the present invention is provided according to an exemplary application. It will be readily understood by one of skill in the art that the present invention may be employed in connection with an almost innumerable variety of application, the particular application described herein being just one example. Further, other architectures are also possible while remaining within the scope and spirit of the present invention as defined by the appended claims.

According to the example, the Mission Collaboration System (MCS) 100 of the present invention as well as the teachings associated therewith are applied in connection with the overall process for a consumer obtaining a loan in connection with a home. As is generally known, the process for obtaining a loan according to present practice is time-consuming, prone to errors, frustrating in many aspects, subject to substantial delays and highly work intensive. One of the primary reasons for this is that many different parties are involved in the overall process with each one generally performing their task(s) serially with respect to other tasks. In many cases, tasks are dependent upon the prior completion of other tasks and can not begin until these other tasks are completed. Thus, one party's delay in processing can cause substantial delays in the completion of the overall mission of loan processing. Delays can result from system outages or malfunctions, delay on the part of human beings responsible for the completion of a particular task, communication errors or a variety of other reasons. Just by way of example, loan processing tasks normally accomplished by an underwriter may not even begin until all information and paperwork is packaged and made available to the particular underwriter. A high level of human intervention as well as paper documents in the current methodology for completing the mission further serves to subject the mission to errors, delays and a high cost of human capital.

According to the teachings of the present invention, the loan processing mission may be accomplished in a more efficient, less costly, and generally superior way. In the example, a user such as an individual seeking a new mortgage may communicate with MCS 100 via user terminal 810 either directly or indirectly. In the former case, communication may be via dial-up, networked or other direct access to a server or other computer housing the MCS functionality. For example, the user may have or be provided with access to a direct link into a network supporting MCS 100.

Alternatively, user interaction with MCS 100 may be on a more indirect basis. For example, a mortgage broker company may maintain the functionality of MCS 100 on a server computer which is accessible via the Internet. In this case, a web page, interactive script or other methodology may be presented to the user to permit the user to access one or more missions available to the user via user terminal 810. For example, once the user navigates to the website of the mortgage broker, the user may be presented with a selection of one or more missions available to the user, such missions being capable of being performed by the particular implementation of MCS 100. The user might be presented with a screen, for example, offering a choice of a mission for applying and completing a mortgage or a mission for receiving a copy of the user's credit report.

According to the methodology of the present invention, the user selects the desired mission at which point the user may be prompted to enter provide additional information either directly through terminal 810 or by reference to location(s) of data available on other systems or on paper or some combination of all of these. In the case of the user selecting a mission for applying for and obtaining a mortgage loan, the user may be required to provide personal information such as name, social security number, address, employer, type of loan desired, contact information, etc. Once the user supplies the information, a mission instance is created for performing the selected mission according to the particular instance initiated by the user and according to the information which the user has supplied.

Although not described in connection with the example as set forth so far, it is also possible for missions to be more customizable "on-the-fly" than as described above. For example, missions may take on different levels of customizability depending upon the requirements of particular applications. As described above, tasks associated with missions are generally predefined before the mission is initiated. A further level of customization allows for the tasks associated with missions to be defined in part during mission execution such as tasks for a particular mission being selected based upon the input provided by the user as described above. Yet a further level of customization calls for missions and the tasks associated therewith to be generated completely during mission execution with only the root level (first task) being predefined. In this case, for example, a root level task may have the function of requesting and receiving task steps from one or more local or remote service nodes during mission execution.

Returning now to the example, once the tasks have been defined the mission may continue to be executed. For example, the tasks in connection with applying for and obtaining a mortgage may be broadly defined as follows:

1. Obtain credit report;
2. Select optimal mortgage product;
3. Initiate and obtain appraisal;
4. Obtain employment information;
5. Underwrite mortgage;
6. Approve mortgage with terms;
7. Close mortgage;
8. Record mortgage with government authority.

Of course, the above described steps are merely exemplary and are broadly defined. Some steps may logically be performed in parallel with other steps while other steps are dependent upon the completion of other steps before they may be initiated. Mission definitions take this requirement into account and are designed to obtain the most time efficient completion of the overall mission based upon its logical makeup. In this example, the initial task may be to obtain the user's credit report from a credit reporting company 820. This may be the initial step because it may be the case that if the user's credit score is below a certain threshold, a loan may not be possible under any conditions and no further processing would be required, other than possibly informing the user of such information. MCS 100 generates a task instance specific to this mission and including, for example, the user's social security number so that the appropriate credit reporting data may be obtained from credit reporting company 820. The task instance is in the form discussed above and in addition to carrying the necessary data such as social security number, the task instance may also carry, among other things, executable code designed to accomplish the task. In this case, such code may accomplish the function of querying credit reporting company's database 825 for the credit information based upon the social security number. In this way, it is not necessary for credit reporting company's server (which in this example, is a remote server) to store the computer code necessary to accomplish the task. Rather, it is transmitted along with the task instance. The interaction between Credit Reporting Company's personnel and the system will be done via terminal 815.

It is further important to note that the present invention may accomplish missions and particular tasks by sending out multiple task instances. In this case, MCS 100 may broadcast the credit report task instance to some or all of the available service nodes which are known by MCS 100 to be capable of handling the task. For example, the credit report task may be sent to each of three credit reporting agencies in parallel via task instance clone communications to each of them. Dependencies may be defined in the mission to provide for various circumstances. For example, the mission may be defined such that a credit report from all agencies may be required prior to the mission being considered accomplished. In this case, the mission may be further defined such that the appraisal task may be launched after a single report is returned although eventually all three reports must be received for mission completion. Various other alternative dependencies may be defined as determined by applicable business rules. Business rules and mission and task definition may be configured by the mortgage company in this case based upon interaction between a mortgage company representative and MCS 100 via mortgage company terminal 805.

Returning to the example, the selection of the optimal mortgage product task may be accomplished based upon the user's credit score and the submission of a task instance containing such score to a remote server or multiple remote servers such as underwriter server #1 845 and underwriter server #2 865 and their associated databases 850 and 860 respectively. In this case, based upon the user's credit information, multiple underwriters (lenders) may be queried, via appropriate task instances, for the best loan product available to this particular user at this particular time. Again, appropriate code may be included with the broadcast task instances to accomplish the query function. Human underwriters may interact with the task (or future tasks later transmitted to the underwriter servers) via underwriter terminals 855 and 870 as applicable.

Based upon the results received from the underwriters and the mission definition, an underwriter may be selected as well as one of their particular products based upon application of the reasoning engine in managing the results returned from the task instances previously broadcast. Continuing with the example, the appraisal request may have been sent out via a task instance in parallel with the requests to the underwriters. This case is indicative of a business rule in which the choice of appraiser would not depend upon the underwriter or the product selected. Alternatively, the mission may be defined such that the appraisal task is only initiated after the underwriter and product has been selected. In this case, the underwriter may require a particular appraiser 830 or appraisal methodology as specified via the results container returned with the task instance to MCS 100 after task completion. Appraisal 830 will do its corresponding work though its database 835 and terminal 840 if Human interaction is required.

Once the appraisal task has been initiated, for example, a task instance may be generated for transmission to the user's employer's remote server 875. Again, employer personnel may interact with the task operation via terminal 885. In this case, for example, employment and salary information for the user, which may be stored in Employer's database 880, may be requested by the task and returned to MOS 100 in the results container of the applicable task instance.

As the mission continues, data such as employment data, which is received by MCS 100 may be communicated to other remote servers via newly generated task instances. For example, when employment information is received concerning the user, a new task may be initiated and the task instance will serve the function of communicating information as received to, for example, an underwriter remote server 845 or 865 to assist the underwriter and underwriter server in processing the application. Once the application has been approved, a task instance may be generated at an underwriter server 845 or 865 for transmission to MCS 100 with the function of communicating the approval to MCS 100 as well as any terms or conditions associated with the loan. At this point, another task instance may be generated to inform the user of approval via terminal 810 as well as any terms or conditions associated with the approval. If accepted, the user notifies MCS 100 of the same and the mission may continue with one or more task instances being generated and broadcasted to one or more closing attorneys using closing attorney server 890. In this case, the task instance may include all information associated with loan processing as well as any required computer code which may be necessary for the attorney to close the loan and/or generate the necessary paperwork.

The selected attorney may interact with task execution via terminal 895 and an associated database 897 may be queried as necessary. Once the loan is actually closed according to the example, title documents such a deed may be generated and automatically transmitted to a recording authority operating recording authority remote server 807. This server 807 may communicate with an associated database 811 to store, for example, recorded deeds accessible by officials and other users such as public users via one or more terminals represented by recording authority terminal 809.

As can be seen, the system and methodology of the present application has broad application in completing missions and sets of tasks associated therewith. Various advantages are achieved such as faster completion of missions, robust and flexibility mission definition and the avoidance of having to store and maintain code at multiple and remote locations. The methodology and system of the present invention may be used with and has applicability to the completion of any mission or set of tasks where the aforementioned advantages are desired. Solely by way of example and not by way of limitation, other applications may include internet based shopping applications, immigration processing, employment screening and hiring processing, distributed software maintenance and updates, processing of governmental related missions such as driver's licenses, taxes and other related tasks.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A mission collaboration system for executing missions comprising:
   (a) at least one mission coordinator;
   (b) at least one service node in communication with said at least one mission coordinator; and
   (c) wherein said missions comprise a plurality of tasks each generated by said at least one mission coordinator and wherein each task is defined by a task instance structure which is communicated to said at least one service node for execution;
   (d) wherein said task instance structure includes a processing engine comprising executable software code which permits said tasks to be executed by said at least one service node; wherein said task instance structure comprises input information storage designating the location of input data which is necessary for the execution of the task instance and multiple task instances are generated in connection with a single task and wherein said multiple task instances are broadcasted to a plurality of service nodes.

2. The mission collaboration system of claim 1 wherein said at least one mission comprises at least one causal task, at least one trigger rule and at least one resultant task, and wherein said at least one causal task generates results which are treated as inputs to a said trigger rule to generate a resultant task represented by a new task instance.

3. The mission collaboration system of claim 2 wherein multiple causal tasks are executed simultaneously and wherein said mission collaboration system waits until the trigger rule conditions are satisfied prior to triggering a resultant task instance.

4. The mission collaboration system of claim 3 wherein at least one causal task is executed at a remote service node.

5. The mission collaboration system of claim 2 wherein at least one of said causal tasks is a root task for initiating execution of said mission.

6. The mission collaboration system of claim 1 wherein at least one said service node is a remote service node.

7. The mission collaboration system of claim 1 wherein said task instance structure comprises a resultant container for storing results associated with the execution of the task instance.

8. The mission collaboration system of claim 7 wherein at least one of said service nodes is a remote service node and wherein said results are communicated back to said mission coordinator.

9. The mission collaboration system of claim 1 wherein multiple tasks are executed simultaneously.

10. A methodology for completing missions in a networked computing environment comprising the steps of:
    (a) selecting a mission;
    (b) creating a mission instance, said mission instance comprising at least one task;
    (c) generating at least one task instance associated with one of said at least one tasks;
    (d) transmitting said at least one task instance to at least one service node;
    (e) executing said at least one task instance on said at least one service node;
    (f) receiving the results of said execution of said at least one task instance; and
    (g) applying a rules-based analysis to determine whether and when additional task instances should be created based upon said results;
    wherein each of said task instances is represented by a task instance structure and each of said task instances is executed on either a local or a remote service node, said task instance structures comprising executable code, and multiple task instances are generated in connection with a single task, and said multiple task instances are broadcasted to a plurality of service nodes and said task instance structures comprise input storage indicative of the location of input data necessary for completion of the task associated with said task instance.

11. The methodology of claim 10 wherein the tasks associated with said mission are predefined.

12. The methodology of claim 10 wherein the tasks associated with said mission are determined based upon input obtained in connection with the selection of said mission.

13. The methodology of claim 10 wherein multiple task instances are executed simultaneously.

* * * * *